US006283393B1

(12) United States Patent
Kang

(10) Patent No.: US 6,283,393 B1
(45) Date of Patent: Sep. 4, 2001

(54) DRAG SEAL FOR SPINNING REEL

(75) Inventor: Young Jue Kang, Tulsa, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/466,358

(22) Filed: Dec. 17, 1999

(51) Int. Cl.$^7$ ..................................................... A01K 89/00
(52) U.S. Cl. ........................... 242/246; 242/319; 277/572
(58) Field of Search ..................................... 242/246, 319, 242/322; 277/549, 551, 560, 572, 573

(56) References Cited

U.S. PATENT DOCUMENTS

| | | |
|---|---|---|
| 5,328,127 | 7/1994 | Yoshikawa . |
| 5,415,359 | * 5/1995 | Ikuta ...................................... 242/319 |
| 5,934,586 | 8/1999 | Kang . |
| 6,149,089 | * 11/2000 | Matsuda ................................. 242/319 |
| 6,173,963 | * 1/2001 | Ho et al. ................................. 277/361 |

* cited by examiner

Primary Examiner—Chuck Y. Mah
Assistant Examiner—Enoch E Peavey
(74) Attorney, Agent, or Firm—Fellers, Snider, Blankenship, Bailey & Tippens, P.C.

(57) ABSTRACT

In a drag assembly for a spinning reel, the drag assembly including a line spool and a drag dial rotatably positioned in a distal end portion of the line spool, the line spool having an interior wall and the drag dial having an outer wall, the improvement comprising a sealing element sealing between the interior wall and the outer wall. The improvement preferably also comprises a groove provided in one of the interior wall and the outer wall. Additionally, the sealing element preferably comprises a first portion positioned in the groove.

6 Claims, 5 Drawing Sheets

DRAG SEAL FOR SPINNING REEL

FIELD OF THE INVENTION

The present invention relates to drag systems for spinning-type fishing reels. More particularly, but not by way of limitation, the present invention relates to drag sealing systems for spinning reels.

BACKGROUND OF THE INVENTION

Spinning-type fishing reels are well known in the art. A typical spinning reel comprises: a body structure; a mounting structure, extending from the top of the body structure, for mounting the reel beneath a fishing rod; a pinion sleeve rotatably mounted through the front end of the body structure; a rotor assembly secured to the forward end of the pinion sleeve; a main shaft slidably extending through the pinion sleeve and through the rotor assembly; a line spool secured on the forward end of the main shaft; a bail wire assembly attached to the rotor assembly for grasping a fishing line in order to wind the line around the line spool; a drive shaft extending laterally into the side of the body structure; a crank handle secured on the exterior end of the drive shaft; a drive gear (e.g., a face gear) mounted on the interior portion of the drive shaft; and an oscillation mechanism for imparting reciprocating movement to the main shaft and the line spool.

Typically, the drive gear meshes with a pinion gear (e.g. a helical gear) formed on the pinion sleeve such that, when the user turns the crank handle, rotational movement is imparted to the rotor assembly. As the rotor assembly rotates, the oscillation mechanism imparts reciprocating movement to the main shaft and the line spool. The reciprocating movement of the line spool ensures that the fishing line is properly wound over the width of the spool. The oscillation mechanism also prevents the main shaft and the line spool from rotating during the winding operation.

The spool of the spinning reel is typically retained on the main shaft by means of a frictional system which prevents rotation of the spool when simply reeling in a fishing lure but allows the spool to rotate with respect to the main shaft when sufficient pull is applied to the fishing line. Thus, for example, when a fish fights against the fisherman's efforts to reel it in, the frictional system responds by yielding/playing out sufficient line, as necessary, to prevent the line from breaking.

As is well known in the art, spinning reels commonly also include drag adjustment systems for selectively adjusting the amount of rotational resistance (i.e., drag) provided between the main shaft and line spool assembly. Such drag systems typically comprise: a spring-loaded adjustment knob or dial rotatably secured at the distal end of the main shaft; a base plate, collar, or other structure extending radially from the main shaft and attached to the main shaft such that the plate, collar, or other structure is prevented from rotating with respect to the main shaft; a friction-reducing washer or other friction-reducing member positioned between the interior end wall of the spool and the base plate; and a plurality of friction drag plates or other structures positioned inside the spool between the interior end thereof and the spring-loaded drag knob. The drag plates are typically of alternating configurations such that (a) one is keyed or otherwise secured on the main shaft such that it cannot rotate with respect to the main shaft, (b) the next is keyed to and rotates with the spool, (c) the next is keyed to the main shaft, (d) etc. Friction-reducing washers or other friction-reducing structures are typically positioned between the drag plates.

The amount of drag provided by the drag system can be increased by turning the drag knob in a tightening direction (typically clockwise) such that the drag dial moves and holds the drag plates and spool closer together and closer to the stationary base plate. Of course, the amount of drag provided can also be reduced as desired by simply rotating the drag knob in the opposite direction.

A need presently exists for an economical and reliable means of sealing spinning reel drag systems such that water, dust, and debris are prevented from entering and interfering with the operation of the drag system. Water, dirt and other debris can easily enter the drag system if, for example, the reel is dropped or placed in the water or on the ground. The infiltration of water and debris can significantly affect the frictional and/or mechanical operation of the drag system.

SUMMARY OF THE INVENTION

The present invention satisfies the needs and alleviates the problems discussed hereinabove. The present invention provides a sealing system for a drag assembly of a spinning-type reel. The drag assembly includes a line spool and a drag dial rotatably positioned in a distal end portion of the line spool, the line spool having an interior wall and the drag dial having an outer wall. The improvement provided by the present invention comprises a sealing element sealing between the interior wall and the outer wall. The improvement preferably further comprises a groove provided in one of the interior wall and the outer wall. Additionally, the sealing element preferably comprises a first portion positioned in the groove.

Further objects, features, and advantages of the present invention will be apparent upon examining the accompanying drawings and upon reading the following description of the preferred embodiments.

DETAILED DESCRIPTION OF THE PREFERRED EMBODIMENTS

Figure 1:
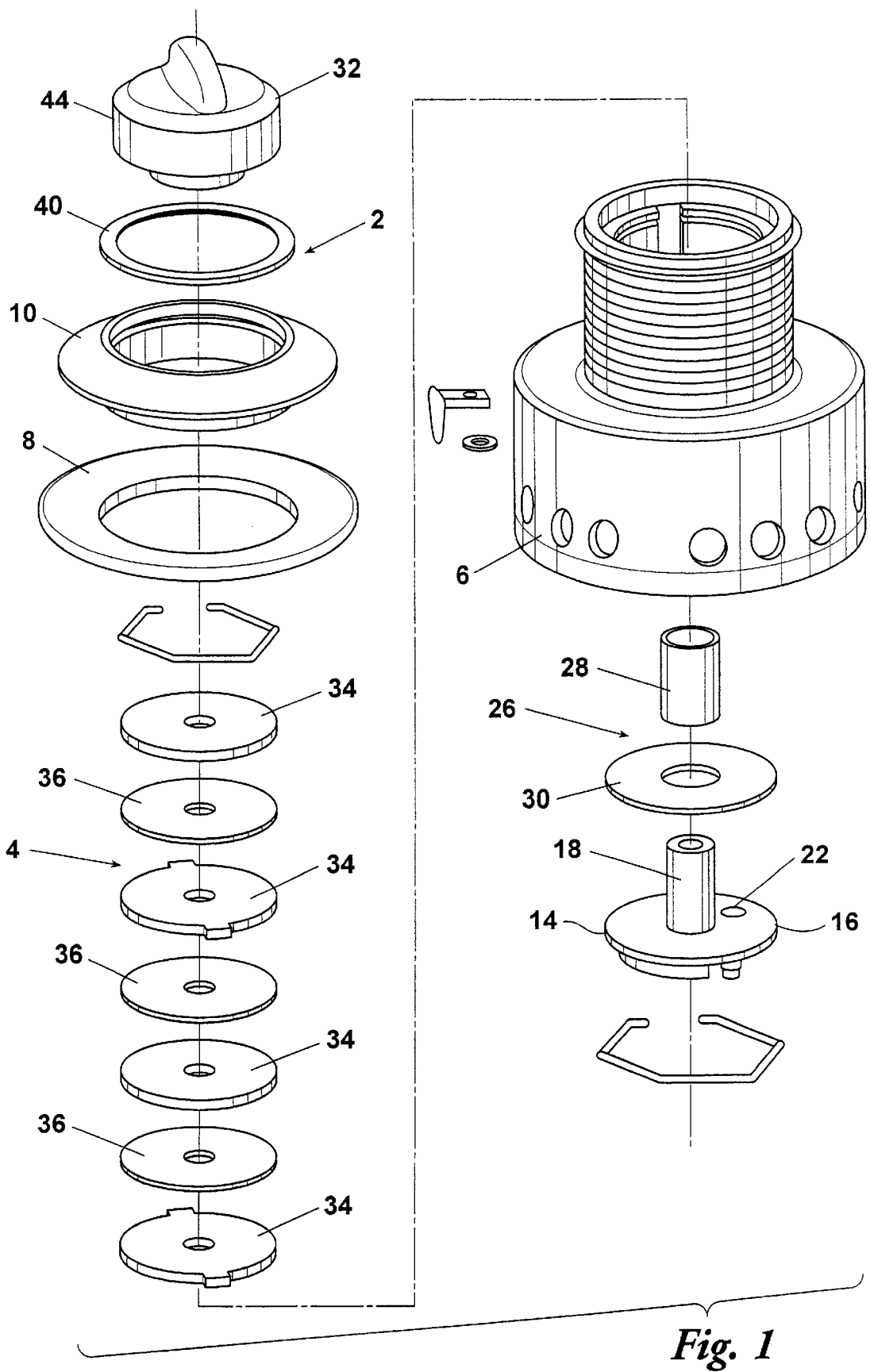
FIG. 1 provides an exploded view of a 3-piece spool 4 having an embodiment 2 of the inventive sealing system installed therein.

An embodiment 2 of the inventive sealing system is depicted in FIGS. 1–8. Embodiment 2 of the inventive system is shown as employed in a three-piece spool 4 of a type known in the art. Spool 4 comprises: a spool body 6; a radially-extending spool lip 8 placed on the distal end of spool body 6; and a spool cap 10 threadedly connected to the distal end of spool body 6 such that cap 10 retains lip 8 on the distal end of spool body 6.

Although the inventive sealing system 2 is depicted as employed in three-piece spool 4, it will be understood that the inventive system is equally adaptable for use in generally any other type of single or multiple piece spool structure or assembly.

Generally, any known type of base plate or other base structure can be used to retain the spool 4 on the main shaft 12 of the spinning reel. In the embodiment depicted in FIGS. 1, 2, and 8, spool 4 is retained on main shaft 12 by means of a known retaining structure 14 which is keyed or otherwise secured on main shaft 12 such that the retaining structure 14 is prevented from either rotating or moving longitudinally on main shaft 12. Retaining structure 14 includes: a radially extending base 16; a cylindrical post 18 which encircles main shaft 12 and extends into a hub 20 provided in the interior end 24 of spool 4; and a flat radial surface 22 provided at the base of post 18 adjacent the radial interior end wall 24 of spool 4. Friction reducing element(s) 26 is/are preferably provided between retaining structure 14 and spool 4. Friction reducer 26 comprises a sleeve portion 28 positioned between the exterior wall of post 18 and the interior wall of spool hub 20 and a radial disk portion 30 positioned between radial surface 22 of retaining structure 14 and the radial interior end wall 24 of spool 4.

Figure 2:
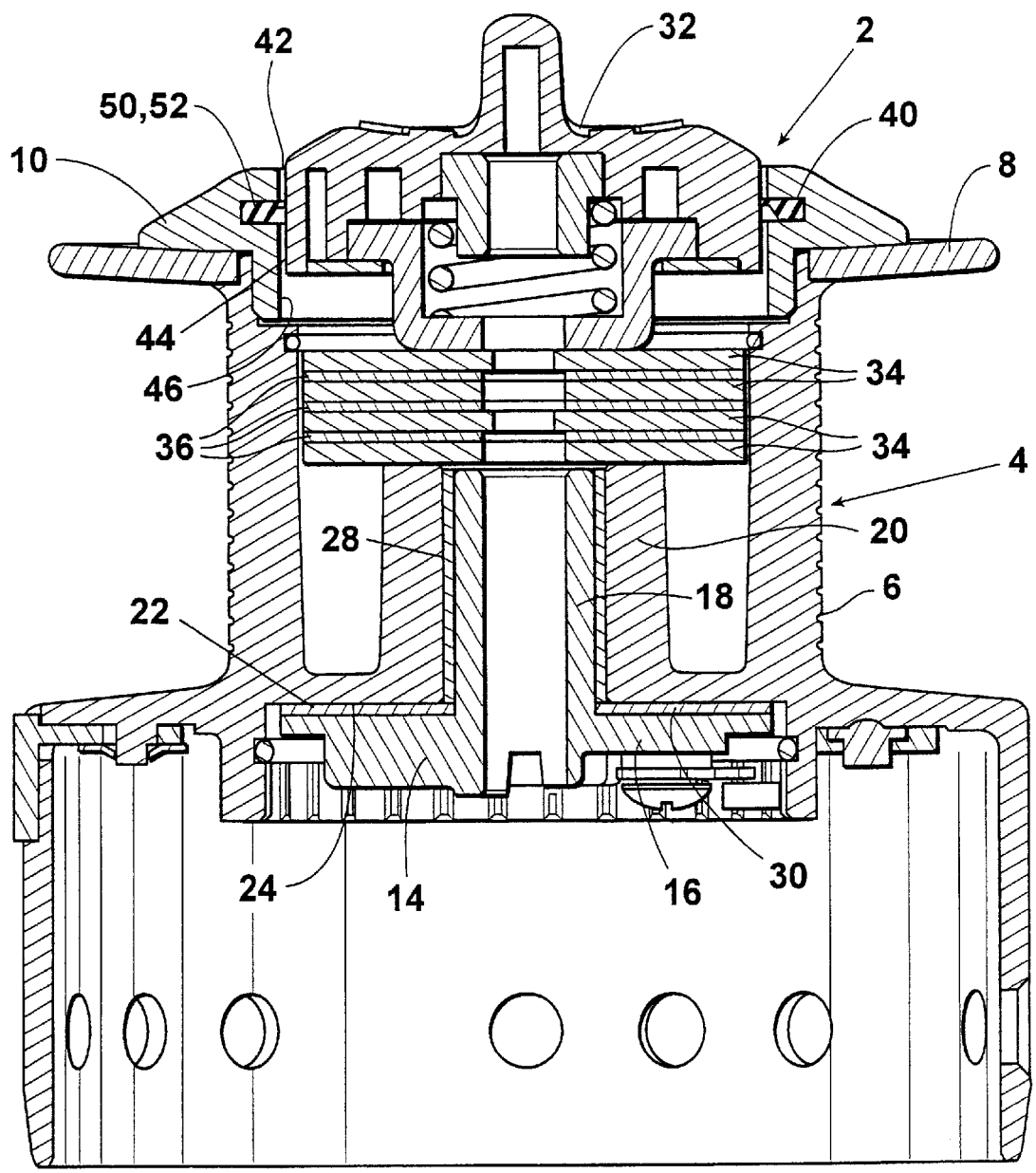
FIG. 2 provides a cutaway elevational side view of spool 4.
Figure 3:
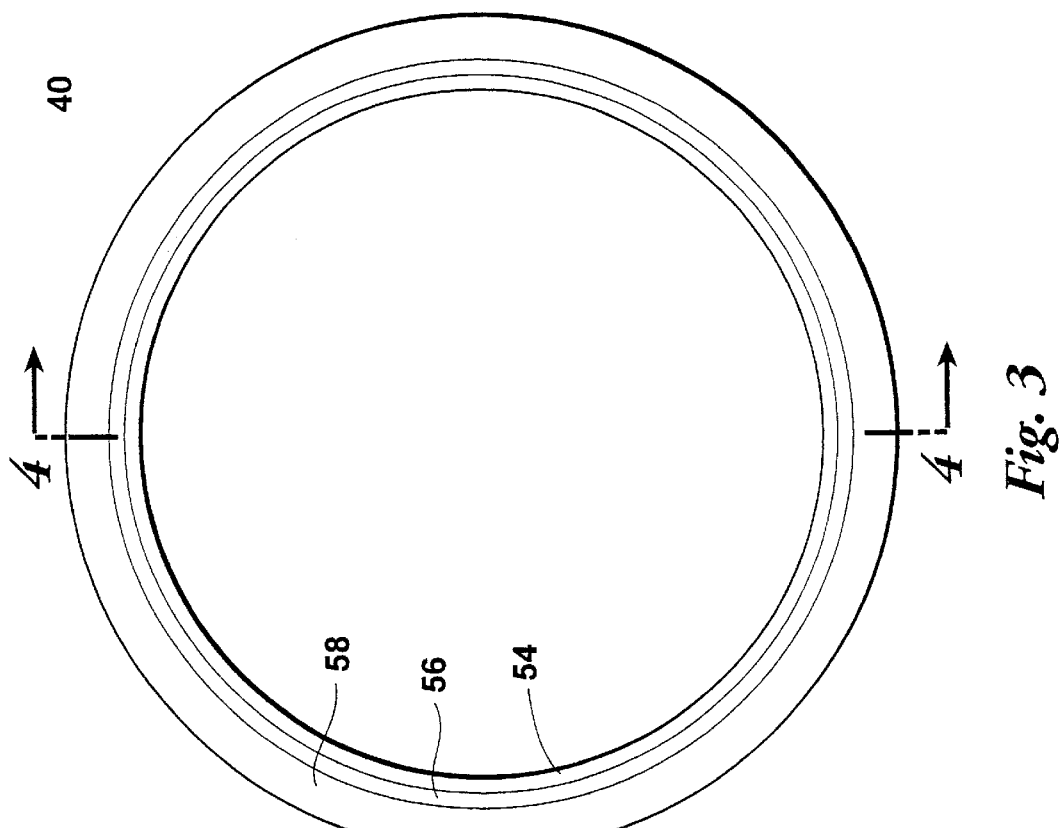
FIG. 3 provides a plan view of seal ring 40 employed in inventive sealing system 2.
Figure 4:
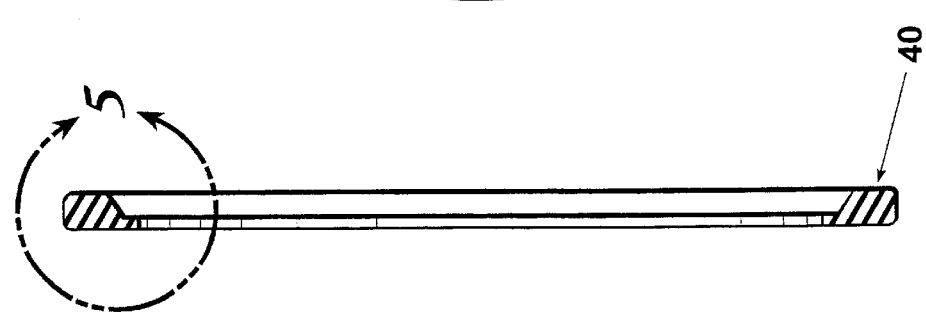
FIG. 4 provides a cutaway side view of seal ring 40 as seen from perspective 4—4 shown in FIG. 3.
Figure 5:
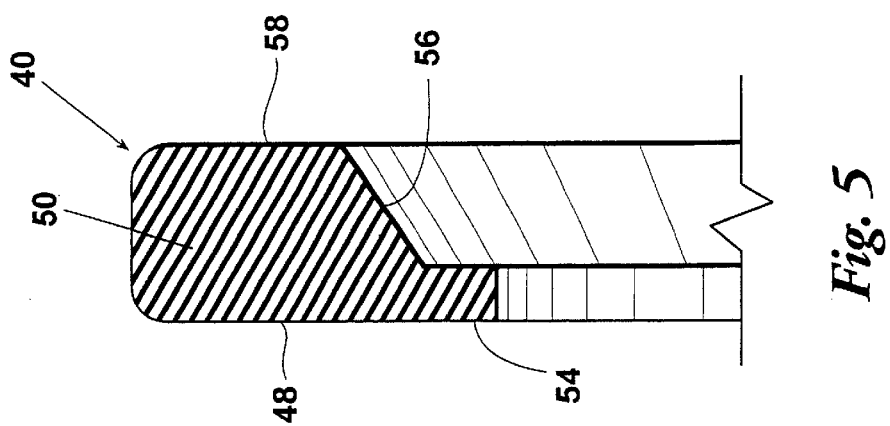
FIG. 5 provides an enlarged view of detail 5 shown in FIG. 4.
Figure 7:
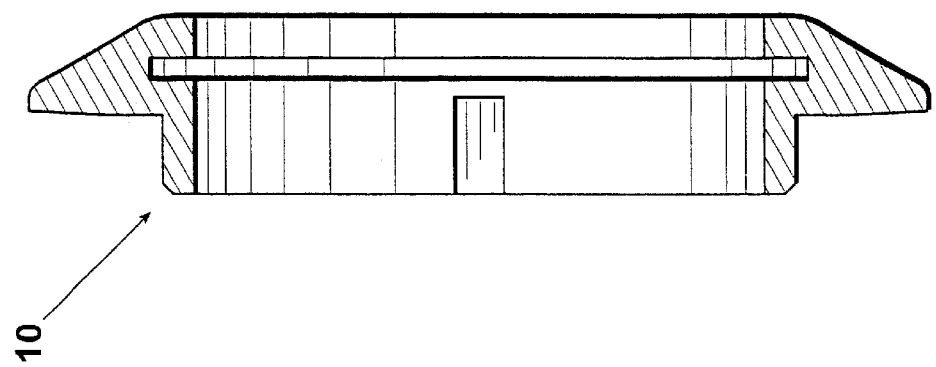
FIG. 7 provides a cutaway side view of spool cap 10 as seen from perspective 7—7 shown in FIG. 6.
Figure 6:
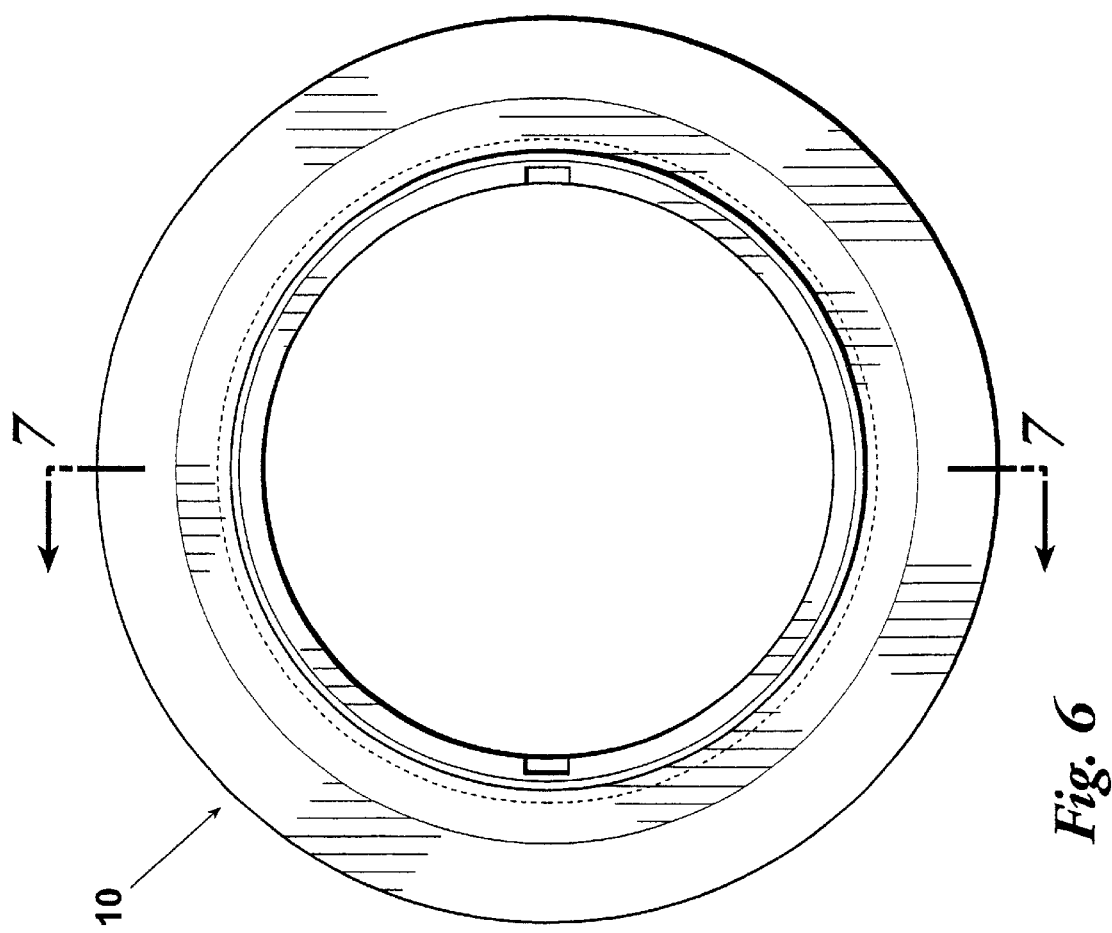
FIG. 6 provides a plan view of a spool cap 10 employed in spool 4.
Figure 8:
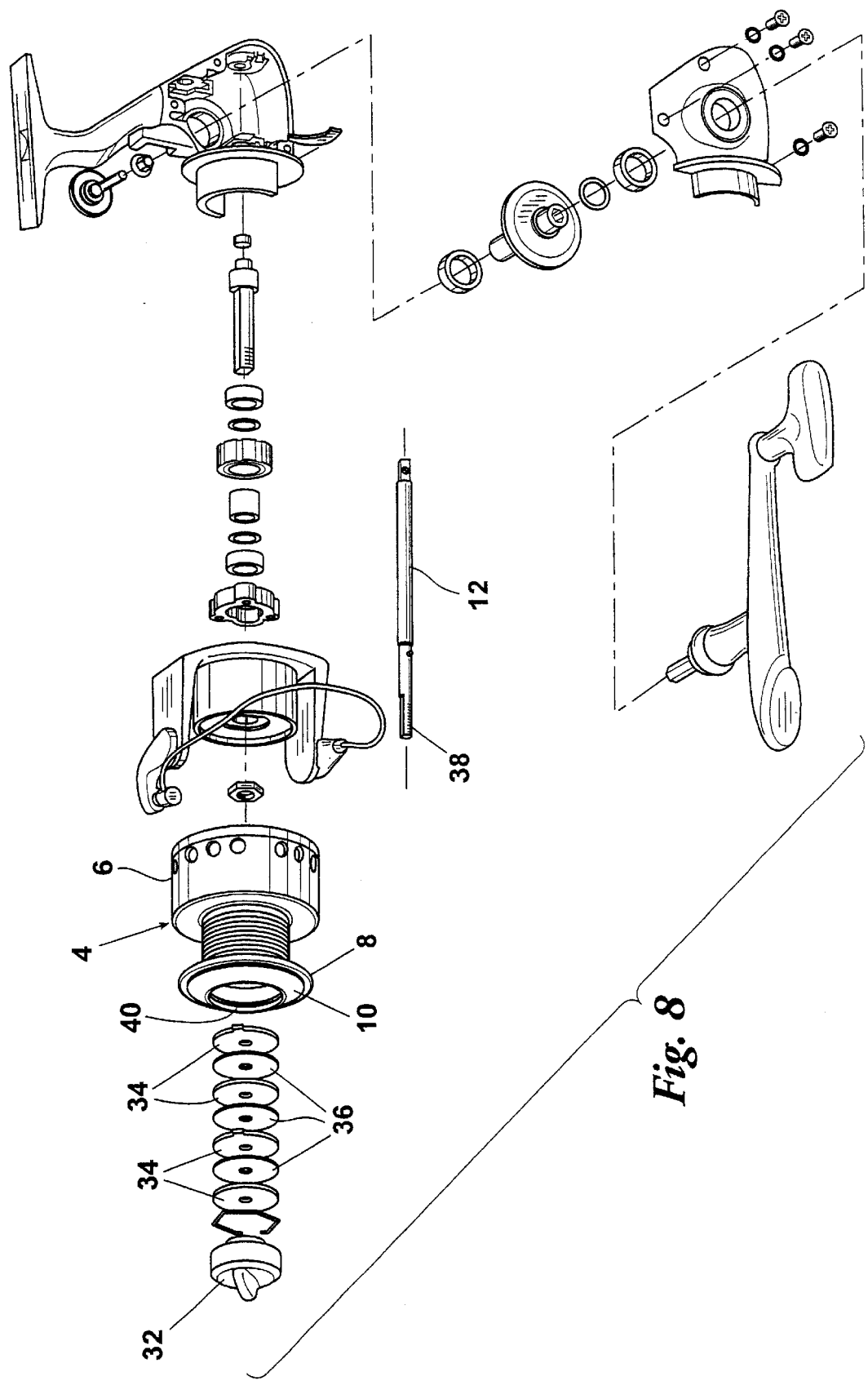
FIG. 8 provides an exploded view of a spinning reel having inventive sealing system 2 installed therein.

As is typically the case, the drag system depicted in FIGS. 1, 2, and 8 further includes a spring-loaded dial/knob 32 which is threadedly attached to the end of main shaft 12. Dial 32 exerts an adjustable force against a plurality of drag plates 34 positioned within spool body 6 around main shaft 12. Friction-reducing washers 36 are provided between drag plates 34. Dial 32 urges and holds drag plates 34 and spool 4 closer together and closer to retaining structure 14, thereby creating drag forces which resist the rotation of spool 4 on main shaft 12. The drag force can be selectively increased or decreased by turning dial 32 such that dial 32 moves on the threaded distal end 38 of main shaft 12 toward or away from drag plates 34.

Inventive sealing system 2 comprises a flexible sealing element (preferably a seal ring) 40 positioned to seal the gap 42 existing between the cylindrical exterior wall 44 of dial 32 and the cylindrical interior wall 46 of spool cap 10. In embodiment 2 of the inventive sealing system, seal ring 40 comprises: a flat radial upper surface 48; a wide outer segment 50 positioned in a groove 52 formed in the cylindrical interior wall 46 of spool cap 10; a narrow interior lip portion 54 which contacts and seals against the cylindrical exterior wall 44 of dial 32; and an angled (frusto-conical) surface 56 which extends from lip 54 to the lower radial surface 58 of outer segment 50.

Alternatively, the inventive sealing system could employ a seal ring comprising: a wide inner portion received in a groove formed in the cylindrical exterior wall 44 of dial 32; and an outwardly projecting lip portion contacting the cylindrical interior wall 46 of spool cap 10. Moreover, although a seal ring structure 40 having a wide portion and a narrower lip portion is preferred, seal ring 40 can be a structure of constant thickness or of generally any other shape. Additionally, although inventive sealing system 2 is depicted as installed in a three-piece spool 4 having a spool cap 10, it will be understood that the inventive system is equally adaptable for installation in and/or sealing against an interior surface of a one-piece spool or generally any other type of spool structure or assembly.

By sealing the gap 42 between dial 32 and the interior wall 46 of the spool, the inventive sealing system effectively and economically prevents water, dirt, dust, and debris from entering the space beneath dial 32, thus preventing such contaminants from affecting the operation of the drag system.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In a drag assembly for a spinning reel, the drag assembly including a line spool body having a distal end, a spool cap connected at said distal end, and a drag dial rotatably positioned in said spool cap, said spool cap having a cylindrical interior wall and said drag dial having an outer wall, the improvement comprising said cylindrical interior wall of said spool cap having a groove provided therein at an intermediate location between a first end and a second end of said cylindrical interior wall and the improvement further comprising a sealing element positioned in said groove and sealing between said cylindrical interior wall of said spool cap and said outer wall of said drag dial.

2. The drag assembly of claim 1 wherein said outer wall is a cylindrical exterior wall.

3. The drag assembly of claim 1 wherein said sealing element comprises a first portion and a lip portion which is narrower than said first portion.

4. The drag assembly of claim 1 wherein said sealing element has a first portion positioned in said groove.

5. The drag assembly of claim 4 wherein:

said outer wall is a cylindrical outer wall and said sealing element includes a second portion which sealingly contracts said cylindrical outer wall.

6. The drag assembly of claim 5 wherein said second portion of said sealing element is narrower than said first portion.

* * * * *